UNITED STATES PATENT OFFICE.

JAMES B. GREER, OF PITTSBURG, PENNSYLVANIA.

COMPOUND FOR PURIFYING WATER.

SPECIFICATION forming part of Letters Patent No. 561,884, dated June 9, 1896.

Application filed March 31, 1896. Serial No. 585,626. (No specimens.)

*To all whom it may concern:*

Be it known that I, JAMES B. GREER, a citizen of the United States, and a resident of Pittsburg, in the county of Allegheny and State of Pennsylvania, have invented certain new and useful Improvements in Compounds for Purifying Water; and I do hereby declare that the following is a full, clear, and exact description of the invention, which will enable others skilled in the art to which it appertains to make and use the same.

My invention relates to an improved compound more especially designed for purifying water for steam-boilers, whereby the scale-producing and corrosive properties are destroyed, although it may be used with advantage for purifying water for domestic and other purposes.

Analysis shows that all the waters throughout the country hold in solution solids and other deleterious matter, which vary in quantity and quality with the location in which the water is produced. The principal deleterious matter found in such water is sulfate of lime and magnesia, carbonate of lime and magnesia, nitrate of lime and magnesia, sulfate of iron, sulfate of alumnia, sulfate of sodium, chlorid of sodium, chlorid of magnesia, free sulfuric and nitric acids, and vegetable and organic impurities. This water in its natural state is unfit for domestic uses and when employed in steam-boilers produces scale therein, corrodes the metal of which the boiler is composed, and tends to cause foaming and priming.

The object of my invention is to provide a compound which, when introduced into the water, will render such deleterious matter harmless; and it consists in a compound of tribasic sodium phosphate and sodium hydrate in about the proportions hereinafter specified.

In carrying my invention into effect I take of tribasic sodium phosphate about ninety per cent. and mix it with about ten per cent. of sodium hydrate, which, when introduced into water in quantities, which will vary with the quality and nature of the deleterious matter contained therein, will chemically combine with the latter, converting them into insoluble salts, which do not possess sufficient cohesion to produce scale.

The compound may be introduced into water contained in tanks, or it may be introduced directly into locomotive and stationary boilers through the suction-pipe or feed-pump or injector along with the feed-water.

In the first case the compound will chemically combine with the solids, converting them into insoluble salts, which will quickly settle to the bottom of the tank, rendering the water clear, soft, and perfectly harmless, and which can be used for domestic or mechanical purposes without danger to health or injurious effects upon a steam-boiler. The soft flaky precipitate can subsequently be removed by washing out with a hose or otherwise.

When the compound is introduced with the feed-water into a steam-boiler, the chemical action will be the same; but the insoluble salts will float in the water at about the water-line, from whence they can be removed by a surface blow-off. The invention will then be of especial value to locomotive-engineers and operators of steam-boilers who make long runs without an opportunity to wash out their boilers.

When the water carries large quantities of free acid, I prefer to first give it a preliminary treatment in a tank or other receptacle and also introduce it into the boiler. This, however, is immaterial, as many ways can be devised for employing the compound or introducing it into the water to be treated.

A compound according to my invention will not only prevent scale formation, corrosive action, and foaming and priming in steam-boilers, but will also act as a preservative of the iron or steel of which the boiler is composed.

Having thus fully described my invention, what I claim is—

1. The herein-described compound for purifying water consisting of tribasic sodium phosphate and sodium hydrate in about the proportions specified.

2. The method herein described of purifying water which consists in introducing therein a compound consisting of tribasic sodium phosphate and sodium hydrate in about the proportions specified which chemically combines with the solids and acids contained therein and converts them into insoluble salts; substantially as described.

In testimony that I claim the foregoing as my own I have hereunto affixed my signature in presence of two witnesses.

JAMES B. GREER.

Witnesses:
 THOS. H. BROWN,
 I. M. BERRY.